United States Patent [19]

Juhasz

[11] Patent Number: 5,893,689

[45] Date of Patent: Apr. 13, 1999

[54] DRILL BIT ADAPTER

[76] Inventor: John C Juhasz, 640 American Blvd., Warner Robins, Ga. 31093-2377

[21] Appl. No.: 08/910,519

[22] Filed: Aug. 7, 1997

[51] Int. Cl.$^6$ ............................................. B23B 51/12
[52] U.S. Cl. ..................... 408/239 A; 279/143; 279/60
[58] Field of Search ........................ 279/143–145, 279/60–65; 408/234 R, 234 A, 240

[56] References Cited

U.S. PATENT DOCUMENTS

| | | | |
|---|---|---|---|
| 2,588,267 | 3/1952 | McLaughlin | 279/145 |
| 2,908,144 | 9/1959 | McManis | 408/240 |
| 3,932,904 | 1/1976 | Nilsson et al. | 279/145 |
| 4,087,195 | 5/1978 | Wood | 408/240 |
| 5,651,647 | 7/1997 | Ray | 279/145 |

FOREIGN PATENT DOCUMENTS 21469   12/1992   WIPO ................................... 279/143

OTHER PUBLICATIONS

Trend–lines Catalog No. 515D, p. 43, 1995.

*Primary Examiner*—Steven C. Bishop

[57] ABSTRACT

A new drill bit adapter for permitting use of drill bits which do not fit on a drill chuck which is provided with an electric drill. The inventive device includes an adapter chuck having a chuck body and an adapter shaft extending from an end of the chuck body. The shaft is sized for being retained by the drill chuck on the electric drill. The opposite end of the chuck body retains drill bits of a size which cannot be retained by the drill chuck. The drill bits are retained by a key operated retaining system, or by a hand tightened system, both of which are conventional.

8 Claims, 2 Drawing Sheets

FIG. 3
FIG. 4
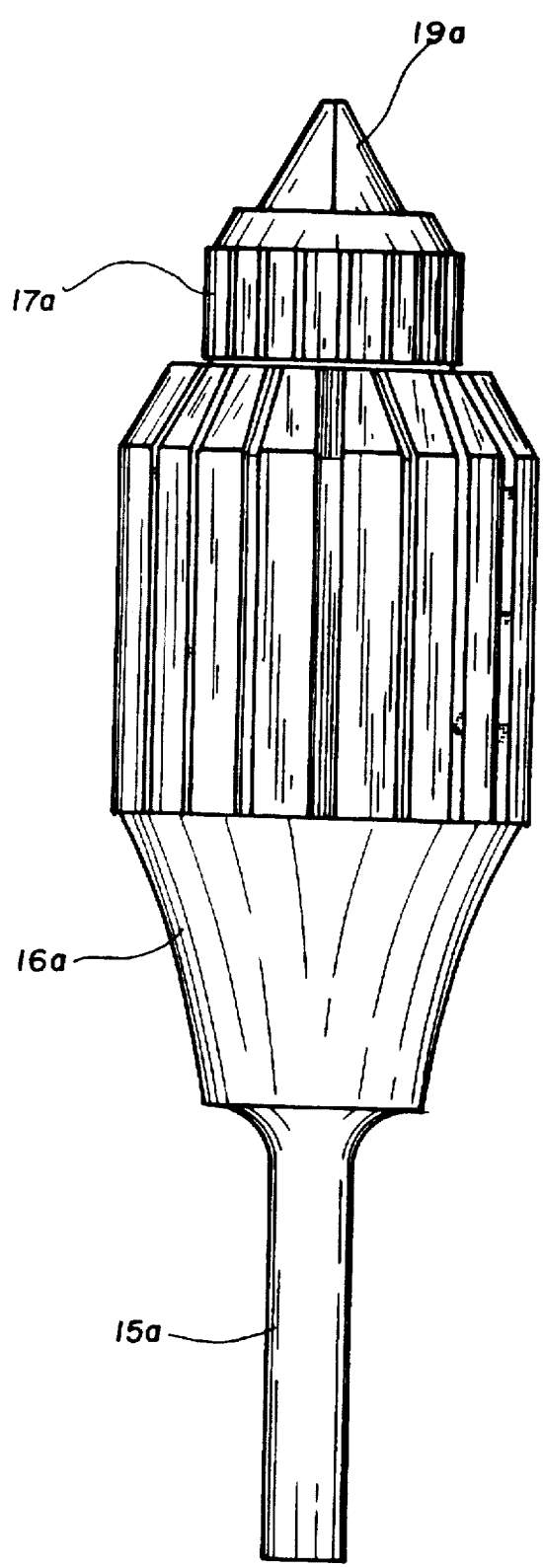
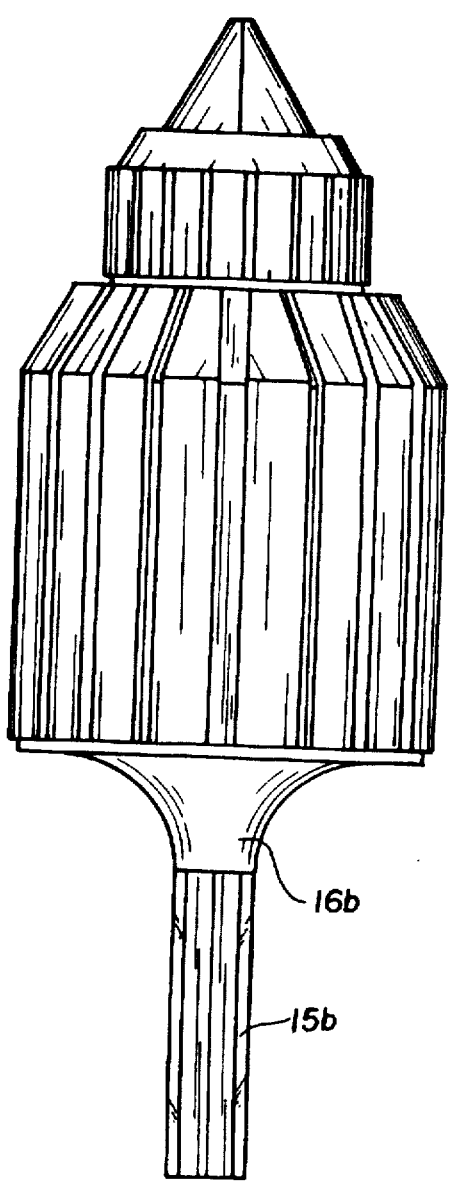

DRILL BIT ADAPTER

BACKGROUND OF THE INVENTION

1. Field of the Invention

The present invention relates to adapters for drill bits and more particularly pertains to a new drill bit adapter for permitting use of drill bits which do not fit on a drill chuck which is provided with an electric drill.

2. Description of the Prior Art

The use of adapters for drill bits is known in the prior art. More specifically, adapters for drill bits heretofore devised and utilized are known to consist basically of familiar, expected and obvious structural configurations, notwithstanding the myriad of designs encompassed by the crowded prior art which have been developed for the fulfillment of countless objectives and requirements.

Known prior art adapters for drill bits include U.S. Pat. No. 4,850,758; U.S. Pat. No. 4,296,656; U.S. Pat. No. 4,615,402; U.S. Pat. No. 4,076,444; U.S. Pat. No. 4,491,443; and U.S. Pat. No. Des. 271,206.

While these devices fulfill their respective, particular objectives and requirements, the aforementioned patents do not disclose a new drill bit adapter. The inventive device includes an adapter chuck having a chuck body and an adapter shaft extending from an end of the chuck body. The shaft is sized for being retained by a drill chuck on an electric drill. The opposite end of the chuck body retains drill bits of a size which cannot be retained by the drill chuck. The drill bits are retained by a key operated retaining system, or by a hand tightened system.

In these respects, the drill bit adapter according to the present invention substantially departs from the conventional concepts and designs of the prior art, and in so doing provides an apparatus primarily developed for the purpose of permitting use of drill bits which do not fit on a drill chuck which is provided with an electric drill.

SUMMARY OF THE INVENTION

In view of the foregoing disadvantages inherent in the known types of adapters for drill bits now present in the prior art, the present invention provides a new drill bit adapter construction wherein the same can be utilized for permitting use of drill bits which do not fit on a drill chuck which is provided with an electric drill.

The general purpose of the present invention, which will be described subsequently in greater detail, is to provide a new drill bit adapter apparatus which has many of the advantages of the adapters for drill bits mentioned heretofore and many novel features that result in a new drill bit adapter which is not anticipated, rendered obvious, suggested, or even implied by any of the prior art adapters for drill bits, either alone or in any combination thereof.

To attain this, the present invention generally comprises an adapter chuck having a chuck body and an adapter shaft extending from an end of the chuck body. The shaft is sized for being retained by a drill chuck on an electric drill. The opposite end of the chuck body retains drill bits of a size which cannot be retained by the drill chuck. The drill bits are retained by a key operated retaining system, or by a hand tightened system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new drill bit adapter apparatus which has many of the advantages of the adapters for drill bits mentioned heretofore and many novel features that result in a new drill bit adapter which is not anticipated, rendered obvious, suggested, or even implied by any of the prior art adapters for drill bits, either alone or in any combination thereof.

It is another object of the present invention to provide a new drill bit adapter which may be easily and efficiently manufactured and marketed.

It is a further object of the present invention to provide a new drill bit adapter which is of a durable and reliable construction.

An even further object of the present invention is to provide a new drill bit adapter which is susceptible of a low cost of manufacture with regard to both materials and labor, and which accordingly is then susceptible of low prices of sale to the consuming public, thereby making such drill bit adapter economically available to the buying public.

Still yet another object of the present invention is to provide a new drill bit adapter which provides in the apparatuses and methods of the prior art some of the advantages thereof, while simultaneously overcoming some of the disadvantages normally associated therewith.

Still another object of the present invention is to provide a new drill bit adapter for permitting use of drill bits which do not fit on a drill chuck which is provided with an electric drill.

Yet another object of the present invention is to provide a new drill bit adapter which includes an adapter chuck having a chuck body and an adapter shaft extending from an end of the chuck body. The shaft is sized for being retained by a drill chuck on an electric drill. The opposite end of the chuck body retains drill bits of a size which cannot be retained by the drill chuck. The drill bits are retained by a key operated retaining system, or by a hand tightened system.

Still yet another object of the present invention is to provide a new drill bit adapter that allows the use of a larger assortment of drill bits on a drill.

Even still another object of the present invention is to provide a new drill bit adapter that eliminates the cost of buying specialty bits which are adapted for use with the chuck on a drill.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic view of an alternate adapter chuck.

FIG. 4 is a schematic view of yet another adapter chuck.

DESCRIPTION OF THE PREFERRED EMBODIMENT

Figure 1:
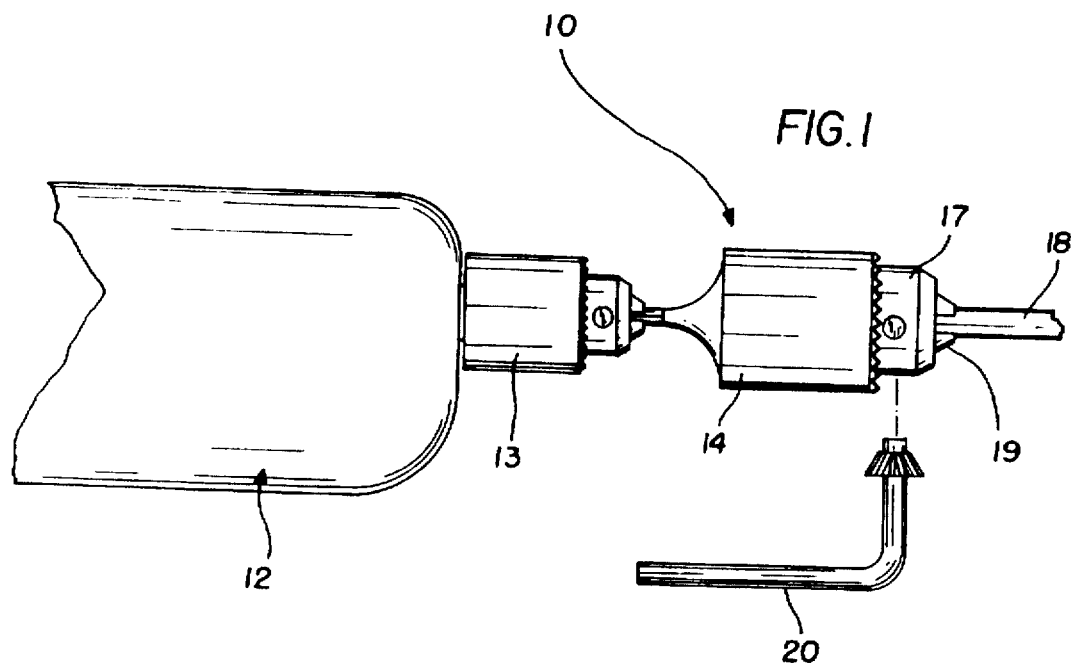
FIG. 1 is a view of a new drill bit adapter according to the present invention attached to a drill chuck on a drill.
Figure 2:
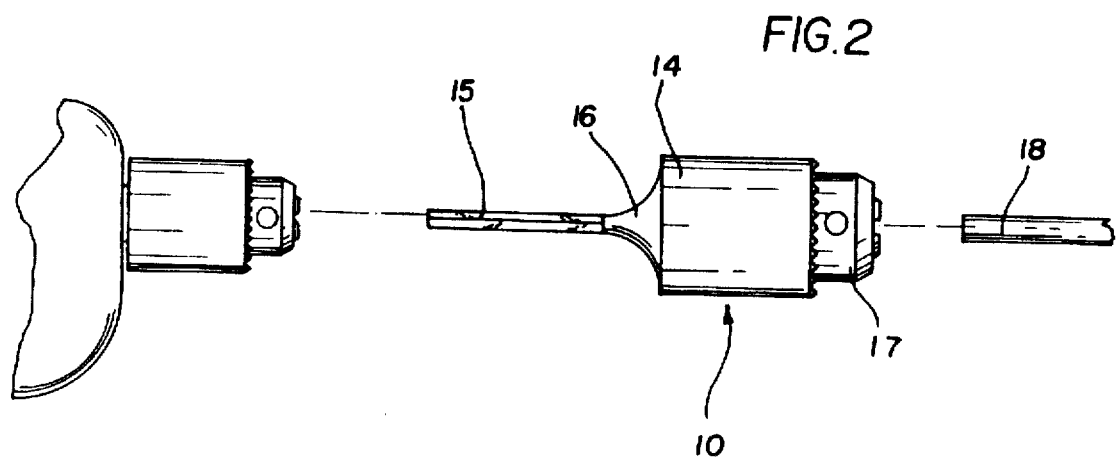
FIG. 2 is a exploded view showing how the adapter is connected to the drill.

With reference now to the drawings, and in particular to FIGS. 1 through 2 thereof, a new drill bit adapter embodying the principles and concepts of the present invention and generally designated by the reference numeral 10 will be described.

As best illustrated in FIGS. 1 through 2, the drill bit adapter 10 is connected to a drill 12 having a standard drill chuck 13. For instance, the drill chuck 13 can be a ⅛" chuck which is operated by a chuck key, in a standard fashion. A ⅛" chuck is able to secure drill bits having a range of sizes, with a ⅛" drill bit being the maximum sized bit. If a bit larger than ⅛" is needed, the drill chuck 13 cannot be used. The adapter 10 permits use of such larger sized bits.

The adapter chuck 10 includes a generally cylindrical chuck body 14 having an adapter shaft 15 extending from one end thereof. The shaft 15 is sized such that it is able to be retained by the drill chuck 13, as shown in FIG. 1. The shaft 15 preferably has a square shape, in order to prevent turning of the shaft within the drill chuck 13. The shaft is connected to the body 14 by a tapered portion 16 which permits the shaft to be fully inserted into the drill chuck.

The opposite end of the chuck body 14 includes a retainer 17 for a drill bit 18. The retainer 17 is identical to conventional retainers on drill chucks, and the structure and operation thereof would be obvious to one having ordinary skill in the art. However, the retainer 17 is configured such that it is able to retain drill bits having a size larger than the size able to be retained by the drill chuck 13, thus permitting a wider range of use of the drill 12.

The retainer, as illustrated in FIGS. 1 and 2, includes a conventional retaining means 19 for locking the bit within the chuck body 14, and which is operated by a conventional chuck key 20.

FIG. 3 illustrates a variation of the adapter, referenced by numeral 10a, which performs a similar function as the adapter 10. However, the adapter 10a has a round adapter shaft 15a with a larger tapered portion 16a. The adapter 10a is also of the keyless variety where the retainer 17a is tightened by hand to lock the retaining means 19a around a drill bit. These types of hand tightened chucks are well known in the art, and no further explanation of its operation is needed.

Another adapter 10b is shown in FIG. 4. This adapter 10b is a keyless type of chuck, similar to the adapter 10a. However, the adapter shaft 15b is generally hexagonal and is attached to the body of the adapter by a smaller tapered portion 16b.

In use, when a large drill bit is needed which cannot fit within the drill chuck 13, the user merely inserts the adapter shaft of the adapter within the drill chuck and secures the adapter in place. The large drill bit is then inserted into the retaining end of the adapter and secures it in place, using the chuck key or by hand. Thus there is no need to buy a specialized drill bit having a tapered end which can be secured by the drill chuck, when use of a large drill bit is required.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adapter chuck for being used in combination with a drill chuck on a drill, the drill chuck being configured to retain drill bits having a maximum size of about ⅛ of an inch, the adapter chuck comprising:

a chuck body with a diameter greater than that of the drill chuck;

an adapter shaft extending from an end of said chuck body with a tapered portion therebetween which forms a continuous arcuate curve between an outer periphery of the chuck body and the shaft, said shaft having a size less than the maximum size for being retained by the drill chuck;

said chuck body including a drill bit retaining end at an end thereof opposite the adapter shaft, said drill bit retaining end being configured for retaining a drill bit having a size greater than the maximum size retained by the drill chuck; and means for retaining the drill bit within the drill bit retaining end.

2. The adapter chuck of claim 1, wherein said adapter shaft is rectangular in shape.

3. The adapter chuck of claim 1, wherein said adapter shaft is round.

4. The adapter chuck of claim 1, wherein said adapter shaft is hexagonal in shape.

5. The adapter chuck of claim 1, wherein said retaining means is key operated.

6. The adapter chuck of claim 1, wherein said retaining means is operated by hand.

7. The adapter chuck of claim 1, wherein a length of the adapter shaft is about 3 and ½ times that of the tapered portion.

8. An adapter chuck system comprising:

a drill;

a drill chuck positioned on the drill, the drill chuck being configured to retain drill bits having a maximum size of about ⅜ of an inch;

a chuck body with a diameter greater than that of the drill chuck;

an adapter shaft extending from an end of said chuck body with a tapered portion therebetween which forms a continuous arcuate curve between an outer periphery of the chuck body and the shaft, said shaft having a size less than the maximum size for being retained by the drill chuck;

said chuck body including a drill bit retaining end at an end thereof opposite the adapter shaft, said drill bit retaining end being configured for retaining a drill bit having a size greater than the maximum size retained by the drill chuck; and means for retaining the drill bit within the drill bit retaining end;

wherein a length of the adapter shaft is about 3 and ½ times that of the tapered portion.

* * * * *